United States Patent [19]

Yeakley

[11] Patent Number: 5,752,669
[45] Date of Patent: May 19, 1998

[54] TAPE DRIVE COUPLING APPARATUS

[76] Inventor: Lester M. Yeakley, P.O. Box 1958, Estes Park, Colo. 80517

[21] Appl. No.: 780,554

[22] Filed: Jan. 8, 1997

[51] Int. Cl.$^6$ ............................................. G11B 15/32
[52] U.S. Cl. ............................................. 242/340
[58] Field of Search ........................ 242/340, 342, 242/349, 352, 352.1; 360/96.3, 96.4

[56] References Cited

U.S. PATENT DOCUMENTS

| | | | |
|---|---|---|---|
| 3,865,331 | 2/1975 | Clever et al. | 242/340 |
| 3,883,090 | 5/1975 | Hall, Sr. | 242/340 |
| 3,987,645 | 10/1976 | Koster et al. | |
| 4,445,651 | 5/1984 | Kimizuka et al. | 242/340 |
| 5,149,222 | 9/1992 | Yeakley . | |
| 5,183,219 | 2/1993 | Abeille et al. | 242/340 |
| 5,308,013 | 5/1994 | Lee et al. | 242/340 |
| 5,432,582 | 7/1995 | Horning et al. | 242/349 |
| 5,433,397 | 7/1995 | Lalouette et al. | 242/340 |
| 5,490,020 | 2/1996 | Albrecht et al. | 360/96.3 |
| 5,625,510 | 4/1997 | Albrecht et al. | 360/96.3 |

*Primary Examiner*—John P. Darling
*Attorney, Agent, or Firm*—Timothy R. Schulte

[57] ABSTRACT

A high torsional stiffness, low axial deflection stiffness, low angular deflection stiffness and low radial deflection stiffness tape drive coupling apparatus includes a base adapted for attachment to a drive motor and a driver engageable with a cassette reel. First and second pairs of parallel flexible rolling tubes are positioned between the base and driver, and the two pairs are disposed orthogonally with respect to each other. In this configuration, the driver is movable axially and angularly with respect to the base by compression and expansion of the flexible tubes. The driver is movable radially with respect to the drive axis by rolling of at least one of the pairs of tubes. The driver is relatively torsionally rigid with respect to the base to facilitate rotational driving engagement of the cassette reel when there exists axial, radial or angular misalignment between the driver and cassette reel.

15 Claims, 4 Drawing Sheets

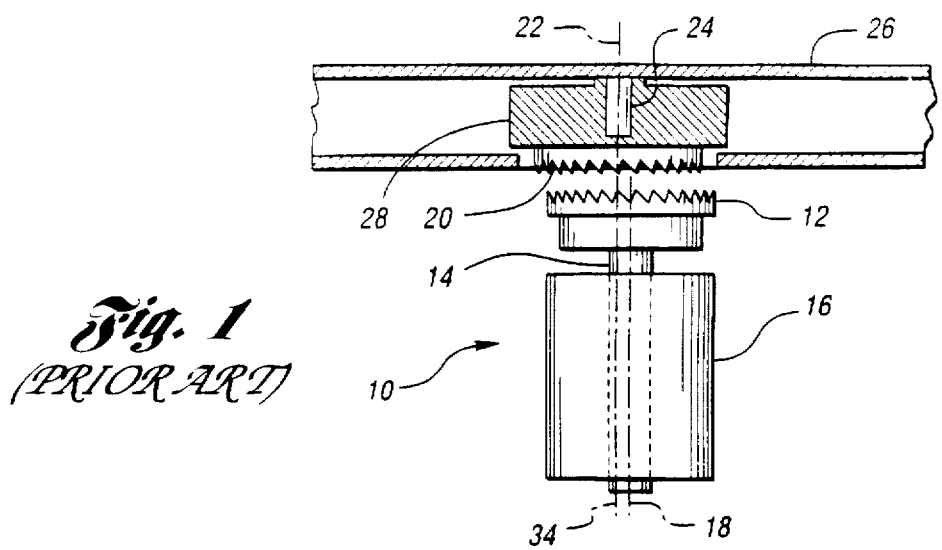
*Fig. 1* (PRIOR ART)
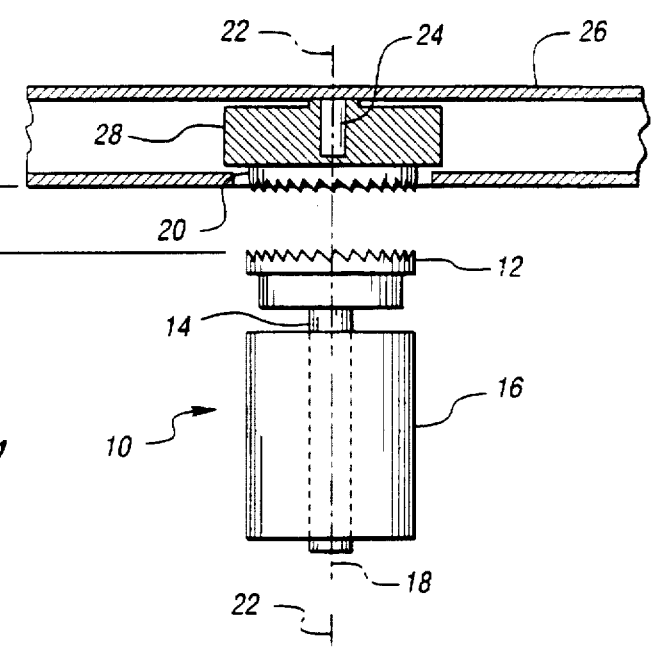
*Fig. 2* (PRIOR ART)
*Fig. 3* (PRIOR ART)

TAPE DRIVE COUPLING APPARATUS

TECHNICAL FIELD

The present invention relates to a tape drive coupling apparatus for driving a cartridge with a drive motor, and more particularly to a high torsional stiffness, low axial, angular and radial deflection stiffness flexible drive shaft system for rotating recordable media.

BACKGROUND OF THE INVENTION

Coupling a drive motor to a cassette reel can be problematic as a result of radial, axial, or angular misalignment between the drive motor output shaft and the cassette reel axle. One option in addressing this problem is to use a data cartridge which incorporates a drive belt. This solution generally only solves the radial misalignment problem. Another option, which is used in all audio and video cassette systems, is to allow the tape reel to float inside the cartridge. The tape reels in such systems do not rotate on axes that are rigidly attached to the cartridge. The reels can move within a certain range to align with the drive axes. Usually, the engagement method has some kind of self-centering device, such as multi-toothed couplings, or the reel is allowed a certain amount of wobble. A third option is to have the tape reels rotate on axes that are rigidly connected to the cassette housing, and allow the driveshaft axes to adjust to the cassette reels. The advantage of this kind of system is that a precision tape path can be defined entirely within the cassette for excellent guiding, low debris generation, etc. In this option, each reel includes an axle with a bearing that is designed to have a close fit, however; the axle will rock slightly if the tape driving mechanism is not aligned with it. This rocking motion results in an unreliable tape path which can cause low quality recording or playing of the tape.

Referring to FIGS. 1–3, an apparatus 10 for driving a tape reel is shown in accordance with a prior art embodiment. The tape drive apparatus 10 includes a multi-toothed coupling 12 which is connected to an output shaft 14 of a motor 16. The output shaft 14 has an axis of rotation 18. The tape reel includes a multi-toothed coupling 20 and is mounted for rotation about an axis 22 by an axle 24 which is connected to a cassette housing 26. As shown in FIG. 1, the motor shaft axis 18 and reel axis 24 are readily misaligned. This will cause the multi-toothed couplings 12,20 to improperly mesh, which will result in rocking of the tape reel 28 on the axis 22 and undue wear between the gears.

Turning to FIG. 2, another meshing problem is illustrated in this Figure, it is shown that the multi-toothed couplings 12,20 are axially misaligned, in that the multi-toothed couplings are undesirably too far apart. This axial misalignment creates difficulty in multi-toothed coupling meshing.

Turning to FIG. 3, another problem associated with prior art tape drive assemblies is illustrated in that the axes 18 and 22 are angularly misaligned, which will lead to improper multi-toothed coupling meshing, which may lead to backlash and other quality problems.

The typical off-center drive problem is addressed in various art areas by mechanical devices, such as universal joints in automobiles, elastic joints in heavy machinery, and bellows couplings or Oldham couplings in precision equipment. None of these prior art devices provide the high torsional stiffness and low axial deflection stiffness required in a tape drive assembly while being capable of supporting a thrust load. The high torsional stiffness is required to rotate the cassette reel and the low axial deflection stiffness is required to prevent the exertion of a tipping torque on the reel axle. Large tipping torques can result in rocking of the reel.

U.S. Pat. No. 5,490,020 to IBM teaches one effort to overcome the above-referenced problem experienced with prior art assemblies. In effect, this design incorporates a version of a universal joint used in cooperation with a telescoping joint for addressing the radial and axial misalignment problems. However, this assembly is very complex and expensive to manufacture, and it exhibits undesirable backlash and the torsional stiffness is too low. Also, the design is very tall, so it consumes substantial space.

A universally flexible coupling is desirable because both the cassette reels and the motors are fixed with respect to their particular reference datums, but each has uncertainty in that location due to manufacturing tolerances. Axial engagement of a motor with a reel may vary by 0.02 inches, radial alignment by 0.010 inches, and angular alignment by 0.5 degrees. The desired universally flexible coupling would be of a constant velocity type, have little backlash, apply minimal side loads to the reels, and demonstrate long life.

DISCLOSURE OF THE INVENTION

The present invention overcomes the above-referenced shortcomings of prior art tape drive coupling assemblies by providing a tape drive coupling apparatus which incorporates two pairs of parallel flexible tubes positioned between a base and driver such that the two pairs are arranged orthogonally with respect to each other to allow side-to-side movement, axial movement, or angular displacement of the driver with respect to the base by rolling and/or compression and expansion of the flexible tubes.

More specifically, the present invention provides a tape drive coupling apparatus for driving a cassette reel with a drive motor having a drive axis, wherein the apparatus includes a base adapted for attachment to the drive motor for rotation therewith, and a driver engageable with the cassette reel. First and second pairs of parallel flexible rolling tubes are positioned between the base and driver. The first and second pairs are disposed orthogonally with respect to each other. In this configuration, the driver is movable axially and angularly with respect to the base by compression and expansion of the flexible tubes. The driver is movable radially with respect to the drive axis by rolling of at least one of the pairs of tubes. Also, the driver is relatively torsionally rigid with respect to the base to facilitate rotational driving engagement of the cassette reel when there exists axial, radial, or angular misalignment between the driver and cassette reel.

Accordingly, an object of the present invention is to provide a tape drive coupling apparatus which provides high torsional stiffness, low axial deflection stiffness, low angular deflection stiffness and low radial deflection stiffness in an inexpensively manufactured assembly.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a schematic illustration of a prior art tape drive coupling apparatus illustrating radial misalignment;

FIG. 2 is a schematic illustration of a prior art tape drive coupling apparatus illustrating axial misalignment;

FIG. 3 is a schematic illustration of a prior art tape drive coupling apparatus illustrating angular misalignment;

DETAILED DESCRIPTION OF THE PREFERRED EMBODIMENT

Figure 4:
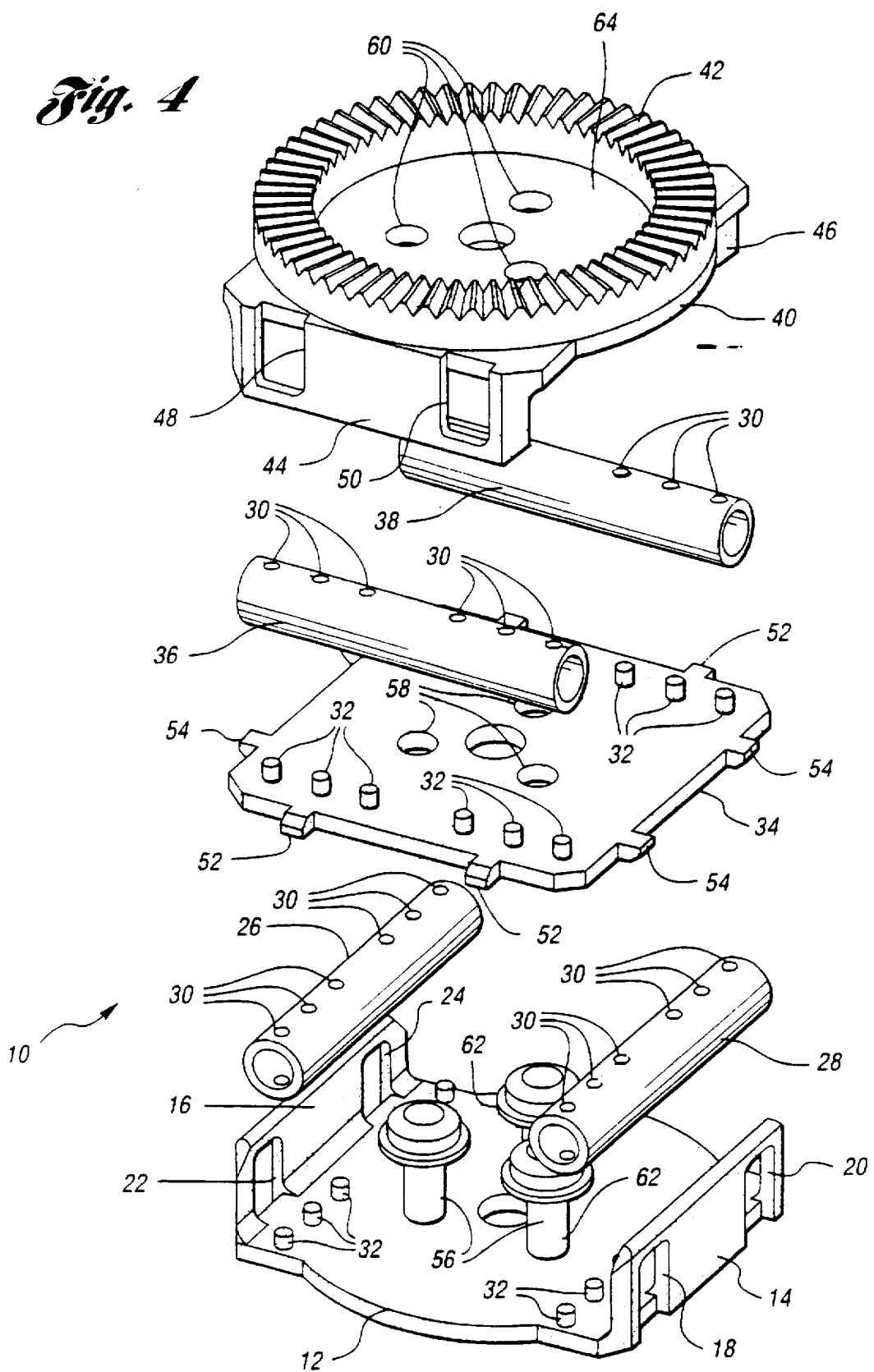
FIG. 4 shows an exploded perspective view of a tape drive coupling apparatus in accordance with the present invention.

Referring to FIGS. 4–8, a tape drive coupling apparatus 10 is shown in accordance with the present invention. The tape drive coupling apparatus 10 includes a base 12 adapted for attachment to the drive motor for rotation therewith. The base 12 includes opposing flanges 14, 16 with slots 18,20, 22,24 formed therein, respectively. A first pair of parallel flexible tubes 26,28 is positioned against the base 12. These flexible tubes 26,28 include a plurality of linearly arranged spaced apertures 30 formed therein on opposing sides thereof. The apertures 30 are aligned for engagement with the pins 32 which extend from the base 12.

A central plate 34 is positioned against the first pair of parallel flexible tubes 26,28, and also includes pins 32 extending from both sides thereof. Referring to FIG. 4, pins extend from the bottom surface of the central plate 34 (not shown) for engagement with the apertures 30 on top of the flexible tubes 26,28.

A second pair of parallel flexible tubes 36,38 is positioned against the central plate 34, and also includes linearly arranged apertures 30 on both sides thereof for engagement with the pins 32 extending from the central plate 34 and from the underside of the driver 40. The driver 40 includes a multi-toothed coupling 42 formed thereon for engagement with the multi-toothed coupling of the cassette reel, as illustrated in FIGS. 1–3. The driver 40 further includes opposing flanges 44,46, each such flange 44,46 comprising a pair of slots 48,50 formed therein.

Figure 5:
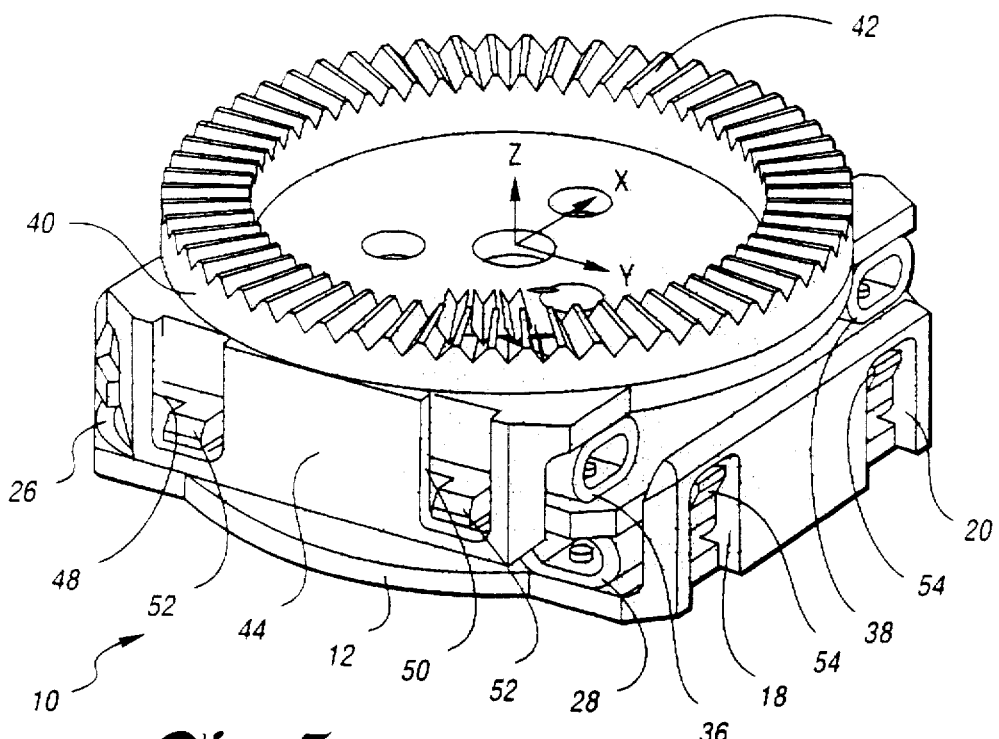
FIG. 5 shows a perspective view of a tape drive coupling apparatus in accordance with the present invention.
Figure 6:
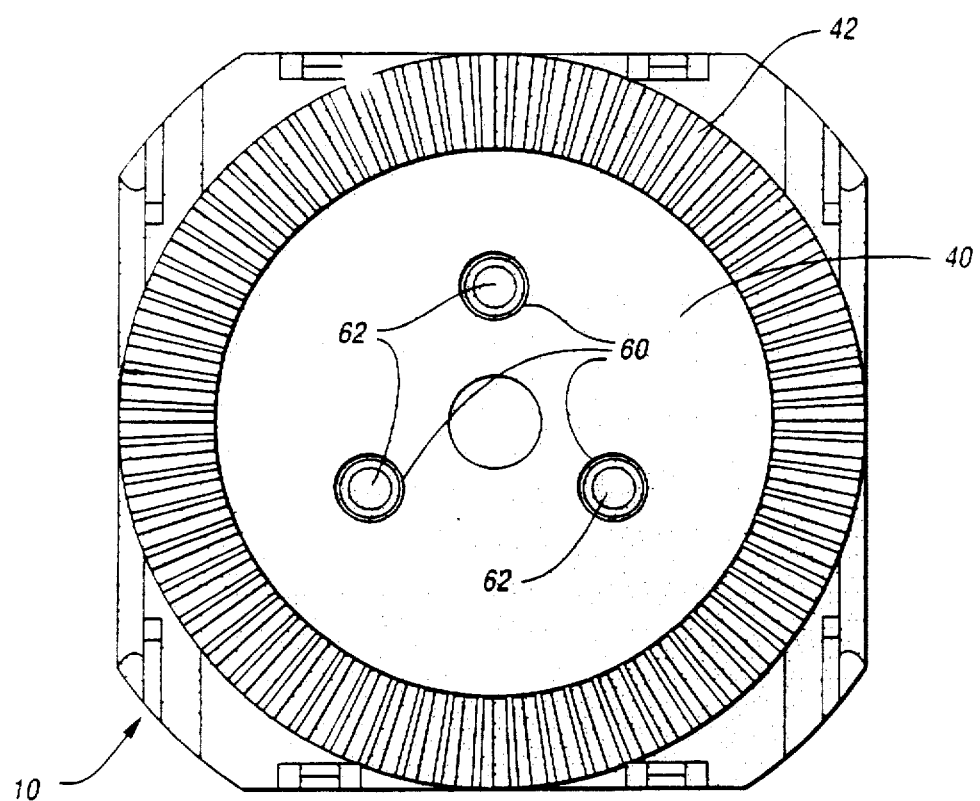
FIG. 6 shows a plan view of the tape drive coupling apparatus shown in FIG. 5.
Figure 7:
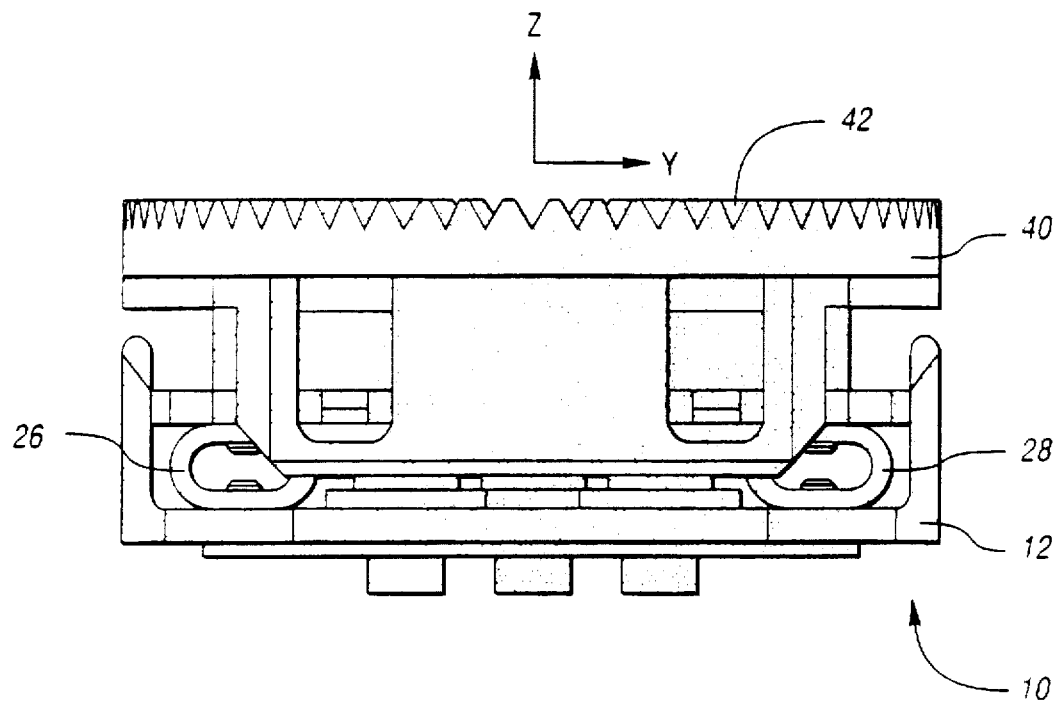
FIG. 7 shows a side view of the tape drive coupling apparatus shown in FIG. 5.
Figure 8:
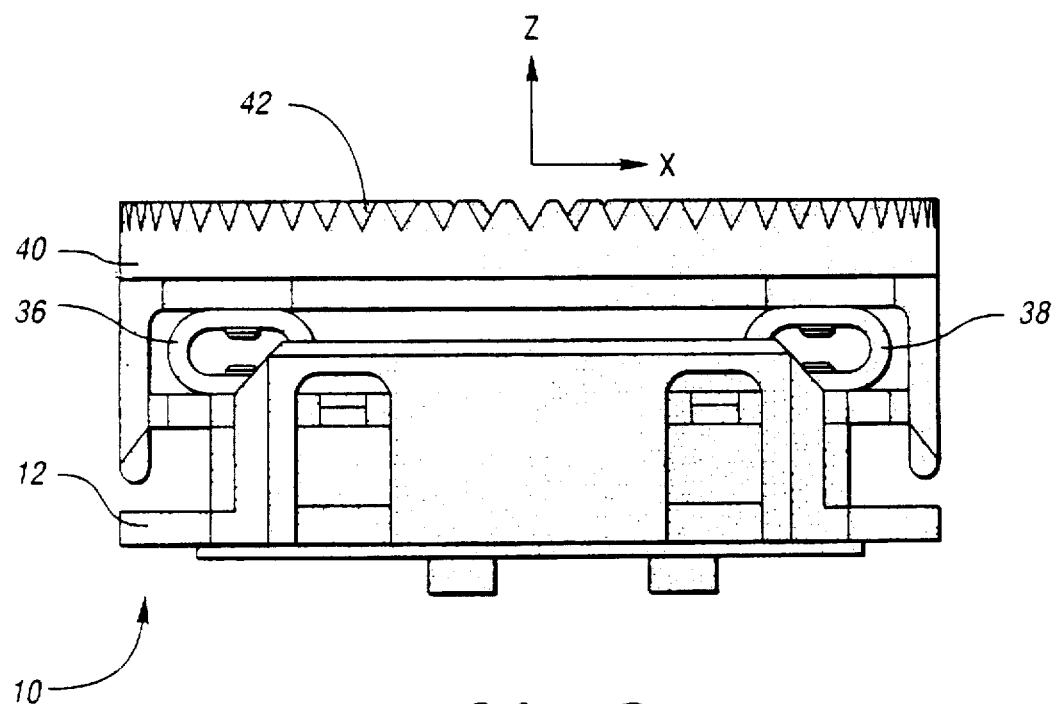
FIG. 8 shows an end view of the tape drive coupling apparatus shown in FIG. 5.

As shown in FIG. 5, the central plate 34 includes tabs 52,54 extending therefrom for cooperation within the slots 18,20, 48,50, as well as slots 22, 24 shown in FIG. 4.

The tape drive coupling apparatus 10 further includes an apparatus for limiting axial separation of the base 14 from the driver 40 while allowing radial and angular misalignment therebetween. Axial separation is limited by tabs 52,54 cooperating within the slots 18, 20, 48, 50. The screws 56 attach the base 12 to the motor. The apertures 58 and 60, formed respectively through the central plate 34 and driver 40, allow access to the screws 56 by a screwdriver.

Accordingly, in this configuration, the driver 40 is movable axially and angularly with respect to the base 14 by compression and expansion of the flexible tubes 26,28, 36,38. The driver 40 is movable radially with respect to the drive axis 18 (shown in FIGS. 1–3) by rolling of the flexible tubes 26,28, 36,38. The rolling motion is limited by clearance between central plate 34 and flanges 14, 16, 44, 46. The driver 40 is relatively torsionally rigid with respect to the base 14 because the flexible tubes 26,28, 36,38 are relatively rigid in the longitudinal direction. Accordingly, this configuration facilitates rotational driving engagement of the cassette reel when there exists axial, radial or angular misalignment between the driver 40 and the cassette reel.

In the preferred embodiment, the flexible tubes 26,28, 36,38 comprise several layers of wrapped polyimide film, such as Kapton™ which is manufactured by DuPont.

Alternatively, the flexible tubes 26,28, 36,38 could comprise a Pellethane™ 2102-75A material manufactured by Dow. The tube is preferably 0.144 inches in cylindrical diameter and 0.025 inches in material thickness. Of course, various other materials such as polyurethane, rubber, etc. could be used for the flexible tubes, and sizes and thicknesses may vary substantially.

With the two pairs of parallel flexible tubes 26,28, 36,38 disposed orthogonally with respect to each other, stiffness is maintained in torsion about the drive axis of the coupling, and high compliance is achieved in all other directions. Referring to FIGS. 5–8, axial compliance is achieved by flexibility of the flexible tubes 26,28, 36,38 in compression (Z direction). Compliance in the X direction is achieved by rolling of flexible tubes 36,38 and compliance in the Y direction is achieved by rolling of flexible tubes 26,28. Torsional compliance about the X and Y axis is achieved by differential compression of all of the flexible tubes 26,28, 36,38.

While the best mode for carrying out the invention has been described in detail, those familiar with the art to which this invention relates will recognize various alternatives designs and embodiments for practicing the invention within the scope of the appended claims.

What is claimed is:

1. A tape drive coupling apparatus having a sufficiently high torsional stiffness, sufficiently low axial deflection stiffness, sufficiently low angular deflection stiffness, and a sufficiently low radial deflection stiffness to reliably rotate a cassette reel with a drive motor having a drive axis, the apparatus comprising:

a base adapted for attachment to the drive motor for rotation therewith;

a first pair of parallel flexible tubes positioned against said base;

a central plate positioned against said first pair of parallel flexible tubes;

a second pair of parallel flexible tubes positioned against said central plate and disposed orthogonally with respect to said first pair of parallel flexible tubes; and a driver engageable with the cassette reel, said driver being positioned against said second pair of parallel flexible tubes;

whereby said driver is movable axially and angularly with respect to said base by compression and expansion of said flexible tubes, said driver is movable radially with respect to the drive axis by rolling of said flexible tubes, and said driver is sufficiently torsionally rigid with respect to said base to facilitate rotational driving engagement of the cassette reel when there exists axial, radial or angular misalignment between the driver and cassette reel.

2. The tape drive coupling apparatus of claim 1, further comprising an apparatus for limiting axial separation of said base and driver while allowing radial and angular misalignment therebetween.

3. The tape drive coupling apparatus of claim 2, wherein said apparatus for limiting axial separation comprises opposing tabs extending from said central plate for cooperation within slots formed in opposing flanges which extend from the base and driver to limit axial separation of the driver and base.

4. The tape drive coupling apparatus of claim 1, wherein each said flexible tube comprises a plurality of apertures formed along the length thereof, and said base, central plate and driver comprise a plurality of corresponding rows of pins for engaging said apertures.

5. The tape drive coupling apparatus of claim 1, wherein each said flexible tube comprises a wrapped polyimide film.

6. A tape drive coupling apparatus for driving a cassette reel with a drive motor having a drive axis, the apparatus comprising:

a base adapted for attachment to the drive motor for rotation therewith;

a driver engageable with the cassette reel; and first and second pairs of parallel flexible rolling tubes positioned between said base and driver, said first and second pairs being disposed orthogonally with respect to each other;

whereby said driver is movable axially and angularly with respect to said base by compression and expansion of said flexible tubes, said driver is movable radially with respect to the drive axis by rolling of at least one of said pairs of tubes, and said driver is sufficiently torsionally rigid with respect to said base to facilitate rotational driving engagement of the cassette reel when there exists axial, radial or angular misalignment between the driver and cassette reel.

7. The tape drive coupling apparatus of claim 6 further comprising a central plate positioned between said first and second pairs of parallel flexible rolling tubes.

8. The tape drive coupling apparatus of claim 7, further comprising an apparatus for limiting axial separation of said base and driver while allowing radial and angular misalignment therebetween.

9. The tape drive coupling apparatus of claim 8, wherein said apparatus for limiting axial separation comprises opposing tabs extending from said central plate for cooperation within slots formed in opposing flanges which extend from the base and driver to limit axial separation of the driver and base.

10. The tape drive coupling apparatus of claim 7, wherein each said flexible tube comprises a plurality of apertures formed along the length thereof, and said base, central plate and driver comprise a plurality of corresponding rows of pins for engaging said apertures.

11. The tape drive coupling apparatus of claim 7, wherein each said flexible tube comprises a wrapped polyimide film.

12. A tape drive coupling apparatus having a sufficiently high torsional stiffness, sufficiently low axial deflection stiffness, sufficiently low angular deflection stiffness, and a sufficiently low radial deflection stiffness to reliably rotate a cassette reel with a drive motor having a drive axis, the apparatus comprising:

a base adapted for attachment to the drive motor for rotation therewith;

a first pair of parallel flexible tubes positioned against said base;

a central plate positioned against said first pair of parallel flexible tubes;

a second pair of parallel flexible tubes positioned against said central plate and disposed orthogonally with respect to said first pair of parallel flexible tubes;

a driver engageable with the cassette reel, said driver being positioned against said second pair of parallel flexible tubes;

an apparatus for limiting axial separation of said base and driver while allowing radial and angular misalignment therebetween;

whereby said driver is movable axially and angularly with respect to said base by compression and expansion of said flexible tubes, said driver is movable radially with respect to the drive axis by rolling of said flexible tubes, and said driver is sufficiently torsionally rigid with respect to said base to facilitate rotational driving engagement of the cassette reel when there exists axial, radial or angular misalignment between the driver and cassette reel.

13. The tape drive coupling apparatus of claim 12, wherein said apparatus for limiting axial separation comprises opposing tabs extending from said central plate for cooperation within slots formed in opposing flanges which extend from the base and driver to limit axial separation of the driver and base.

14. The tape drive coupling apparatus of claim 12, wherein each said flexible tube comprises a plurality of apertures formed along the length thereof, and said base, central plate and driver comprise a plurality of corresponding rows of pins for engaging said apertures.

15. The tape drive coupling apparatus of claim 12, wherein each said flexible tube comprises a wrapped polyimide film.

* * * * *